(12) United States Patent
Wu et al.

(10) Patent No.: US 8,042,778 B2
(45) Date of Patent: Oct. 25, 2011

(54) FLAT PANEL DISPLAY MOUNTING DEVICE

(75) Inventors: Min-Chuan Wu, Taipei (TW); Hung-Hsin Yu, Taipei (TW)

(73) Assignees: Andrew H. Lew, Taipei (TW); Jin Fang, Taipei (TW); George K. Liu, Taipei (TW); Elsa L. R. Lu, Taipei (TW); Hung-Hsin Yu, Taipei (TW)

( * ) Notice: Subject to any disclaimer, the term of this patent is extended or adjusted under 35 U.S.C. 154(b) by 21 days.

(21) Appl. No.: 12/631,755

(22) Filed: Dec. 4, 2009

(65) Prior Publication Data

US 2010/0078538 A1      Apr. 1, 2010

Related U.S. Application Data

(62) Division of application No. 11/852,536, filed on Sep. 10, 2007, now Pat. No. 7,648,112.

(51) Int. Cl.
*E04G 3/00* (2006.01)

(52) U.S. Cl. ........... 248/282.1; 248/289.11; 248/917; 248/919; 361/679.06

(58) Field of Classification Search .......... 248/282.1, 248/289.1, 276.1, 917–921, 274.1, 289.11, 248/122.1, 125.2, 125.7, 416, 418; 361/679.02, 361/679.06, 679.27, 681–683
See application file for complete search history.

(56) References Cited

U.S. PATENT DOCUMENTS

| | | | | |
|---|---|---|---|---|
| 6,905,101 | B1 * | 6/2005 | Dittmer | 248/274.1 |
| 7,345,870 | B2 * | 3/2008 | Shin | 361/679.27 |
| 7,395,996 | B2 * | 7/2008 | Dittmer | 248/291.1 |
| 7,398,950 | B2 * | 7/2008 | Hung | 248/276.1 |
| 7,487,943 | B1 * | 2/2009 | Gillespie | 248/282.1 |
| 2007/0252056 | A1 * | 11/2007 | Novin | 248/205.1 |
| 2007/0252060 | A1 * | 11/2007 | McPherson | 248/282.1 |
| 2009/0050763 | A1 * | 2/2009 | Dittmer | 248/284.1 |

* cited by examiner

*Primary Examiner* — Tan Le
(74) *Attorney, Agent, or Firm* — WPAT, P.C.; Anthony King

(57) ABSTRACT

A flat panel display mounting device for securing a flat panel display, such as an LCD or plasma television, to a support surface, such as a wall, is disclosed. The flat panel display mounting device comprises a plurality of members in the form of support panels pivotally connected together and a rotation control mechanism connected thereto so that the flat panel display mounted on the device can be rotated to a desired angle and the center of gravity of the flat panel display during rotation can be maintained as close to the support surface as possible, so as not to generate additional burden to the flat panel display mounting device.

6 Claims, 6 Drawing Sheets

FLAT PANEL DISPLAY MOUNTING DEVICE

CROSS-REFERENCE TO RELATED APPLICATIONS

This application claims priority to, and is a Divisional of, U.S. application Ser. No. 11/852,536, filed on Sep. 10, 2007, now pending, which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of all of the prior art of record and any search that the Office deems appropriate.

FIELD OF THE INVENTION

The present invention relates to a flat panel display mounting device, and more particularly to such a device having planar structure for adjusting the viewing angle of the flat panel display mounted thereon without translational movement.

BACKGROUND OF THE INVENTION

Flat panel displays, such as LCD and plasma television, have become increasingly popular and now almost dominate the market which used to belong to the traditional CRT. Because flat panel displays are thin in profile, they are often mounted on walls, brackets or other vertical flat surfaces in order to save space. For a better viewing angle, flat panel displays are often mounted on a support device which can be rotated to a desired angle. Numerous patents directed to mounting devices having function of adjustable viewing angle can be found.

Some prior art, such as U.S. Pat. No. 7,063,295 (Gil Soon Kwon), U.S. Pat. No. 6,402,109 (Jay Dittmer), U.S. Pat. No. 6,554,242 (Sang Wook Kim), is directed to mounting devices having mechanisms which enable them to be rotated about a horizontal axis and thus the angle to their mounting surface can be adjusted.

Some prior art, such as U.S. Pat. No. 6,905,101 (Jay Dittmer), U.S. Pat. No. 6,102,348 (Edward L. O'Neill), WO 2006/014051 (Mock, Dae Gwan), discloses mounting devices having mechanisms which enable them to be rotated about a vertical axis and thus the angle to their mounting surface can be adjusted. U.S. Pat. No. 6,905,101 further includes a mechanism which enables the mounting device disclosed therein to also be rotated about a horizontal axis and thus the angle to its mounting surface can be adjusted.

It is noted that the mechanisms shown in the above patents are generally in the form of links or arms. The links or arms have the advantage of simple structure, but are weak or too large, when they are used to support an object having substantial weight, particularly if they are required to be rotatable. Furthermore, as the display panel gets larger and heavier, the structure of a support device formed of links or arms can be too weak to safely support a heavy flat panel display.

Furthermore, when the angle of a display is adjusted, the center of gravity of the device as disclosed above along with the display will be displaced away from the wall or the surface where the device/display is mounted, and the displacement will impose additional burden on the support device, especially in translational movement, aggravating the problem of structural weakness of the support device.

SUMMARY OF THE INVENTION

The object of the present invention is to overcome the weakness in the structure inherent to most support devices for flat panel displays in which links and arms are used.

The specific measure of the present invention is using panels instead of the links or arms used in the prior art devices. Three, four, and six rigid and rectangular panels connected by hinges are disclosed. The panels of the present invention are made into a structure constructed by plates or truss, wherein the truss can be solid or hollow. The panels of the present invention can also be made of plates punched to have a structure similar to that of truss. The panel structure can be as thin as possible yet still maintains enough structural strength to support a heavy flat panel display.

In the present invention, a rotation control mechanism is used with the support mechanism so that when the support mechanism is rotated to a desired angle, it rotates about only one axis at a time. The support mechanism can rotate about another axis only when the support mechanism resumes its initial position. This ensures a minimum displacement of the center of gravity of the mounting device and display combined away from the wall on which the mounting device is mounted, and accordingly the minimum arm of force. In other words, translational movement during adjustment of the angle of the display can be avoided.

DETAILED DESCRIPTION OF THE INVENTION

Figure 1:
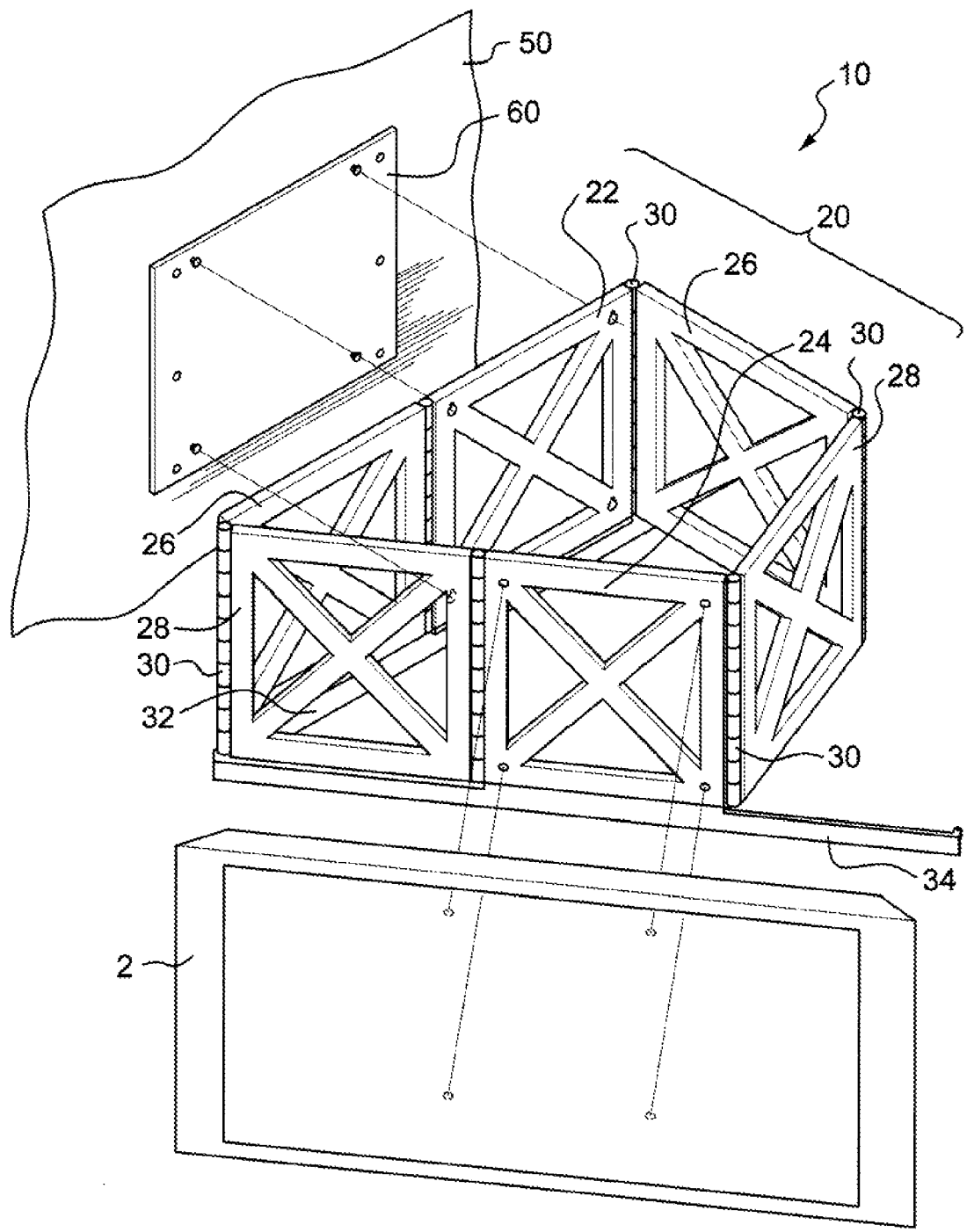
FIG. 1 shows an embodiment of a flat panel display mounting device of the present invention (with the rotation control mechanism removed, but including the wall where the device is mounted and the flat panel display mounted on the device)
Figure 2:
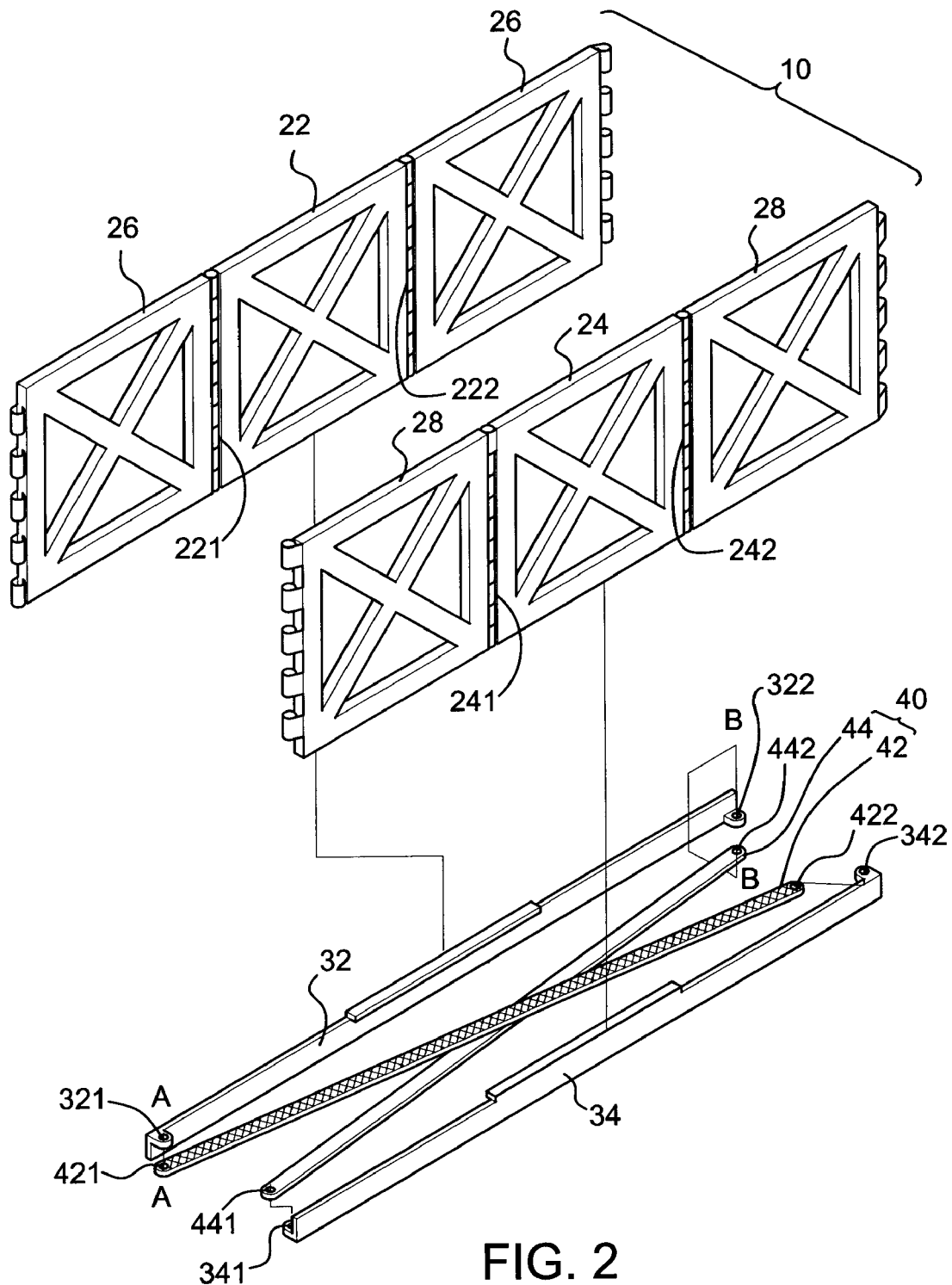
FIG. 2 is an exploded view of FIG. 1 (with rotation control mechanism added)
Figure 3:
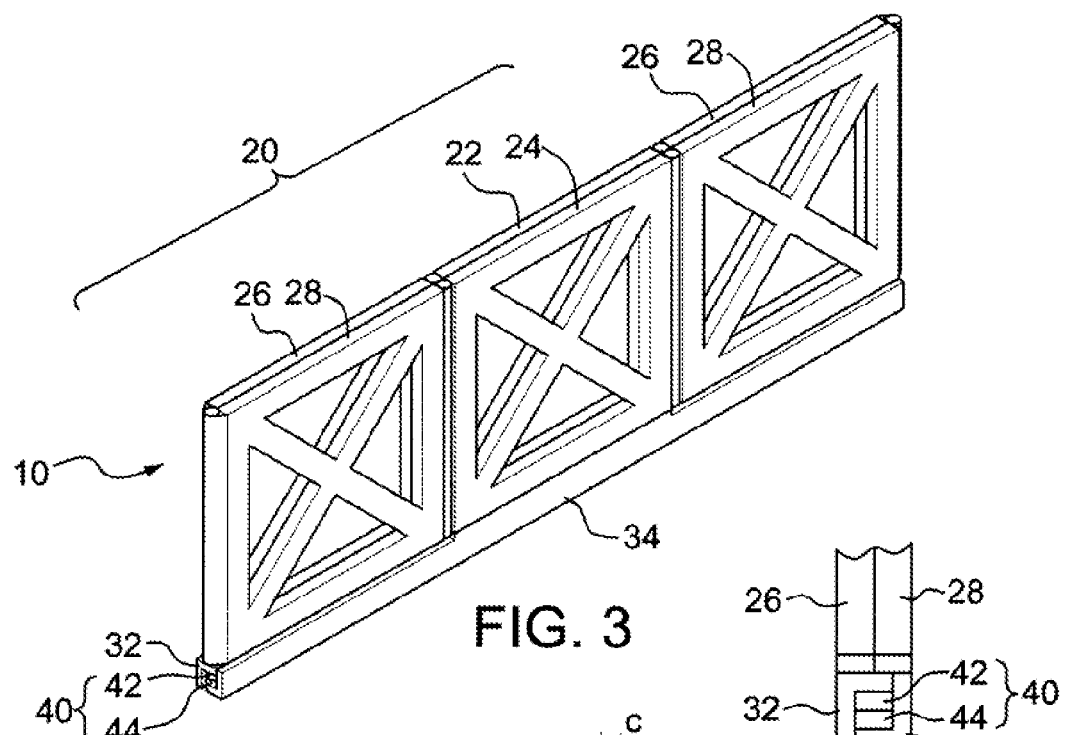
FIG. 3 shows the mounting device in folded state.
Figure 4:
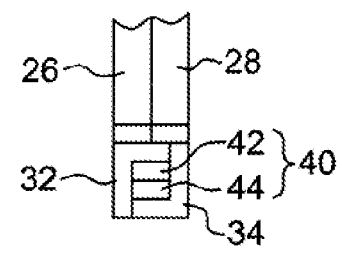
FIG. 4 shows the side view of the mounting device.

FIG. 1 shows a first embodiment of the flat panel display mounting device 10 and FIG. 2 shows an exploded view thereof. The device 10 comprises a support mechanism 20, which further comprises a base support panel member 22, a display support panel member 24, and two pairs of rotatable support panel members 26 and 28. The base support panel member 22 is fixed to a support surface or on a wall 50 via a mounting plate 60 by means of, for example, screws. The display support panel member 24 is adapted to support a flat panel display 2. The display support panel member 24 is pivotally connected to the base support panel member 22 via the two pairs of rotatable support panel members 26 and 28 by means of, for example, hinges 30. Specifically, the two pairs of rotatable support panel members 26 and 28 are configured in the following manner: one of the two pairs of the rotatable support panel members 26 and 28 is pivotally connected to the left edge 221 of the base support panel member 22 and the left edge 241 of the display support panel member 24; the other of the two pairs of the rotatable support panel members 26 and 28 is pivotally connected to the right edge 222 of the base support panel member 22 and the right edge 242 of the display support panel member 24; each pair of the rotatable support panel members contains two support panel members 26 and 28 pivotally connected to each other.

Figure 5:
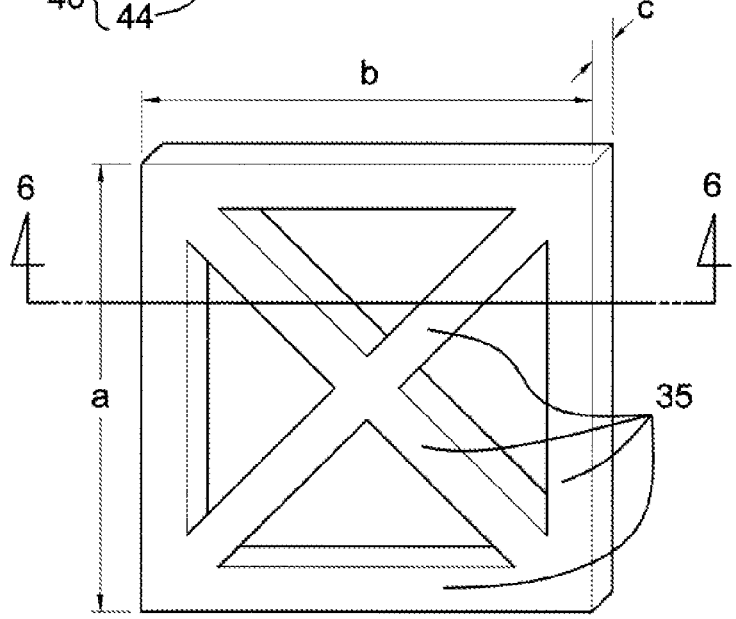
FIG. 5 shows one of the panel members.
Figure 6:
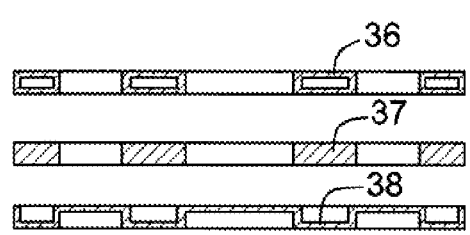
FIG. 6 shows three preferable kinds of cross-section of a panel member.

As shown and described above, the support mechanism 20 is constructed by support panel members 22, 24, 26, and 28. Compared with links or arms, support panel members can sustain much heavier load and suffer less structural deformation. As shown in FIGS. 5 and 6, to reduce the weight of the support panel members, it is preferred that they are constructed by truss 35, where the truss can be hollow 36 or solid 37 (see FIG. 6). The support panels can also be made of punched plates 38 (see FIG. 6). The support panel structure can be as thin as possible yet still maintains enough structural strength to support a heavy flat panel display.

As shown in FIG. 1, the base support panel member 22 includes a base extension 32, and the display support panel member 24 includes a support extension 34. The base extension 32 is fixed to the base support panel member 22 by means of welding or screws. The support extension 34 can be fixed to the display support panel member 24 in similar ways.

As shown in FIG. 2, the device 10 further comprises a rotation control mechanism 40. The mechanism 40 comprises a first link 42 and a second link 44. The left end 421 of the first link 42 is pivotally connected to the left end 321 of the base support extension 32, and the right end 422 of the first link 42 is pivotally connected to the right end 342 of the display support extension 34. Similarly, the left end 441 of the second link 44 is pivotally connected to the left end 341 of the display support extension 34, and the right end 442 of the second link 44 is pivotally connected to the right end 322 of the base support extension 32.

Figure 7:
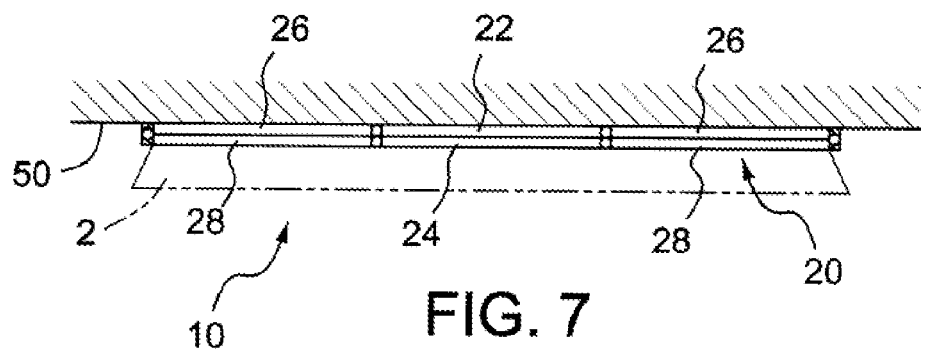
FIG. 7 shows a first embodiment of the present invention in folded state.
Figure 8:
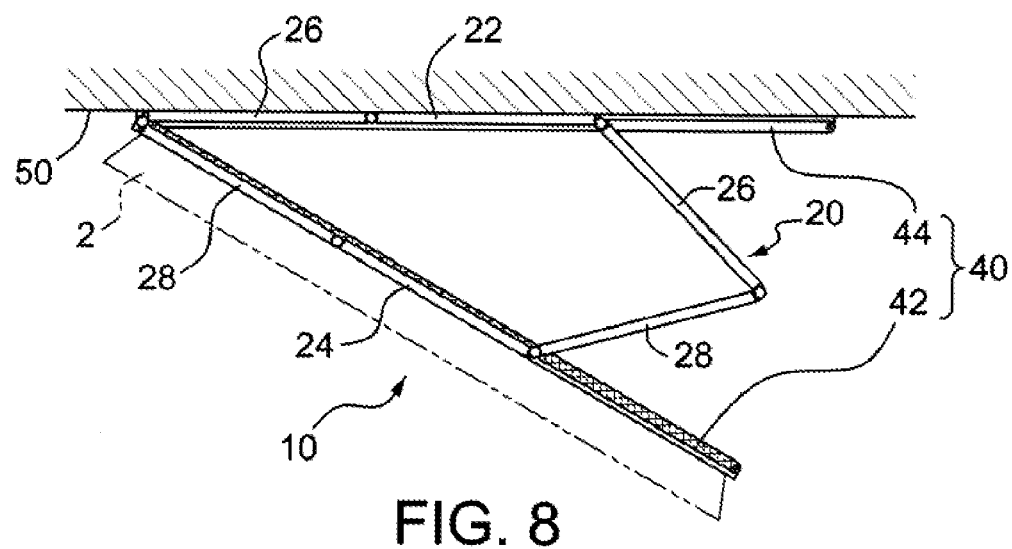
FIG. 8 shows the first embodiment which is adjusted to a desired angle.
Figure 9:
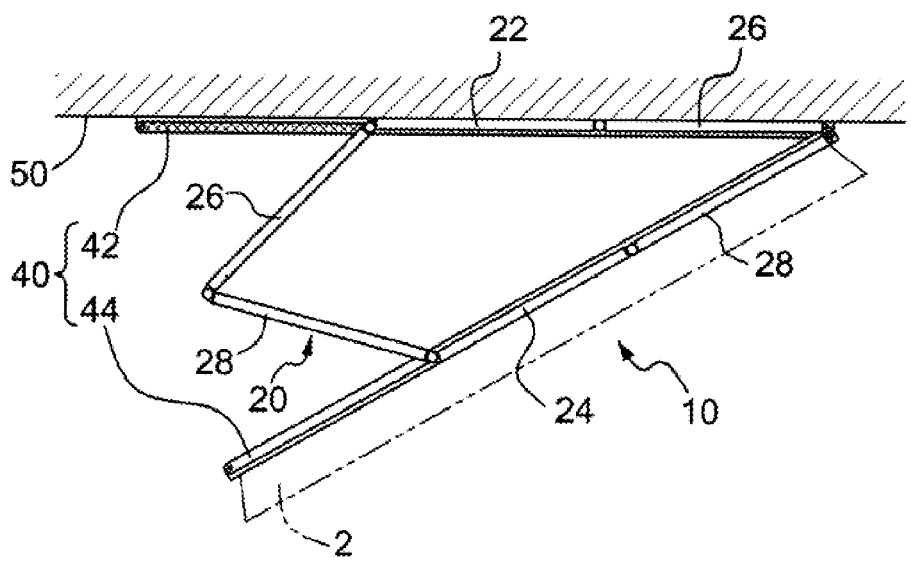
FIG. 9 shows the first embodiment which is adjusted to another desired angle.

With the rotation control mechanism 40 connected to the support mechanism 20 as described in the previous paragraph, the flat panel display 2 can be rotated to an angle shown in FIGS. 8 and 9. It can be understood from FIGS. 2 and 7-9 that the flat panel display 2 can only rotate about axis A or axis B at a time. The flat panel display 2 cannot simultaneously rotate about axes A and B. If the initial position of the flat panel display 2 is shown in FIG. 7, the flat panel display 2 in the position shown in FIG. 8 to be rotated to a position shown in FIG. 9 must be first rotated back into its initial position and then be rotated into the other position shown in FIG. 9. The rotating operation ensures a minimum displacement of the center of gravity of the flat panel display 2 away from the surface of the wall 50. In other words, there is only angular component of movement of the center of gravity of the flat panel display 2 and no translational component during angular adjustment of the flat panel display 2. Thus, the loading, i.e., the combined weight of the mounting device 10 and the flat panel display 2 and the moment that it generates exerted on the support mechanism 20 during the rotation can be as low as possible.

Figure 10:
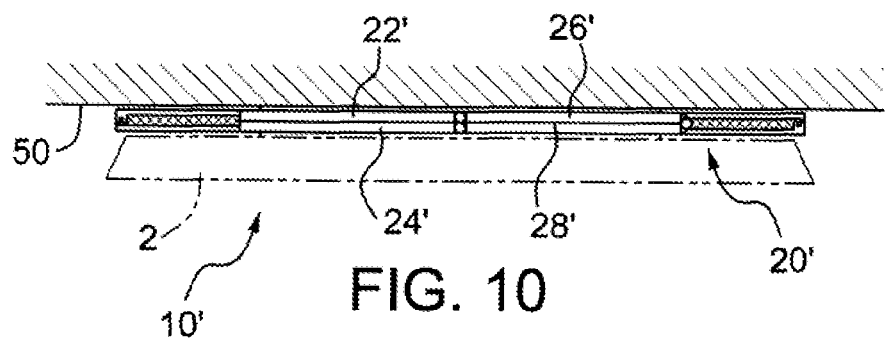
FIG. 10 shows a second embodiment of the present invention in folded state.
Figure 11:
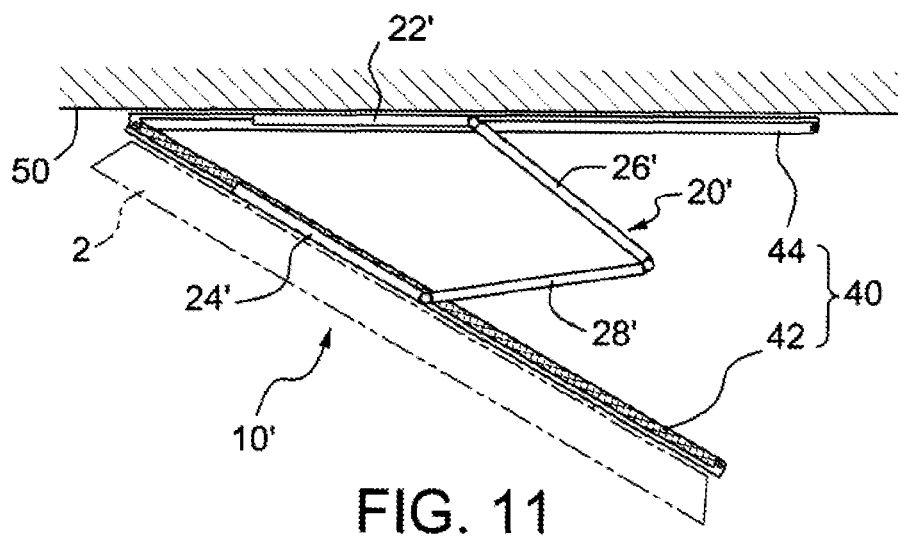
FIG. 11 shows the second embodiment which is adjusted to a desired angle.
Figure 12:
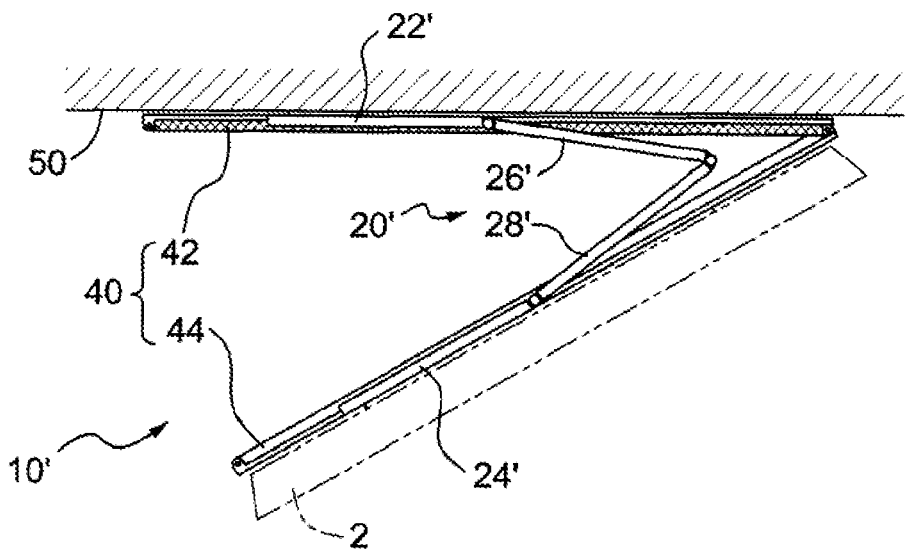
FIG. 12 shows the second embodiment which is adjusted to another desired angle.

FIGS. 10-12 show the second embodiment of the mounting device 10' of the present invention. In this embodiment, the support mechanism 20' comprises a base support panel member 22', a display support panel member 24', and one pair of rotatable panel members 26' and 28'. The configuration of the entire device 10' is similar to that of the first embodiment except that the support mechanism 20' comprises only two rotatable support panel members 26' and 28'. In this embodiment, the pair of rotatable support panel members 26' and 28' are configured in the following manner: the pair of the rotatable support panel members 26' and 28' is pivotally connected to the side edge of the base support panel member 22' and the side edge of the display support panel member 24', and the two rotatable support panel members 26' and 28' are pivotally connected to each other. In this embodiment, the axis between display support panel member 24' and support panel member 28' should be close to the center position of display 2. While it turns to right or left, both sides should hold the same wide angle.

Figure 13:
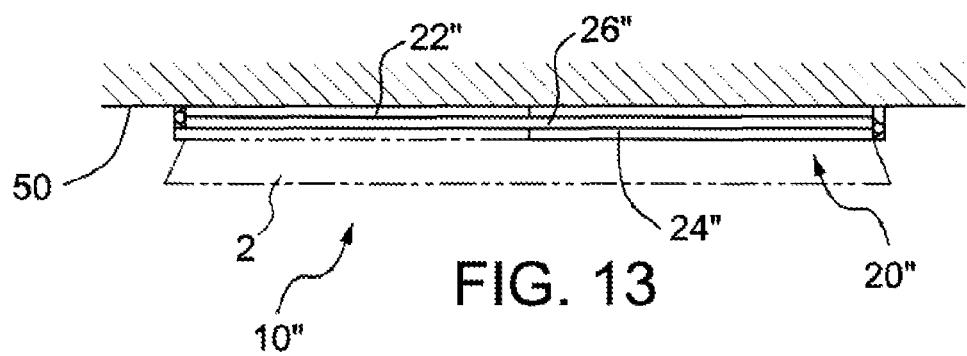
FIG. 13 shows a third embodiment of the present invention in folded state.
Figure 14:
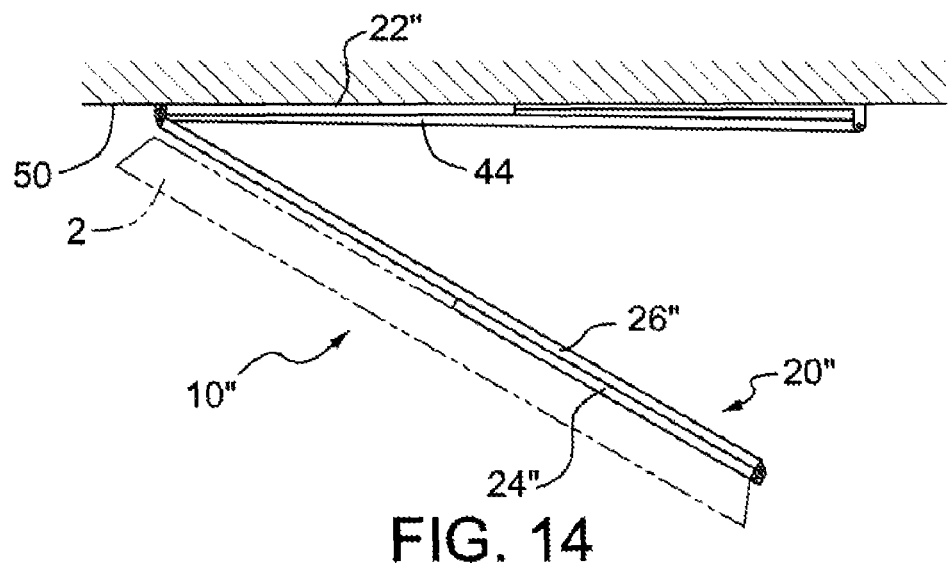
FIG. 14 shows the third embodiment which is adjusted to a desired angle.
Figure 15:
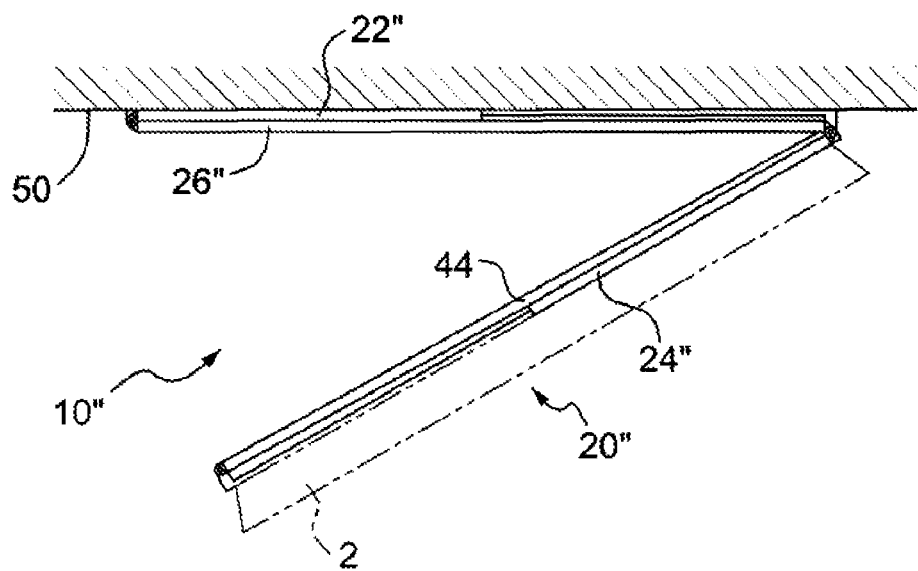
FIG. 15 shows the third embodiment which is adjusted to another desired angle.

FIGS. 13-15 show the third embodiment of the present invention. In this embodiment, the support mechanism 20" comprises a base support panel member 22", a display support panel member 24", and one rotatable support panel member 26". The configuration of the entire device 10" is similar to that of the first embodiment except that the support mechanism 20" comprises only one single rotatable support panel member 26" and the rotation control mechanism only comprises one second link 44, i.e. the first link which the first and second embodiments comprise can be omitted because its function can be taken over by the rotatable support panel member 26". The rotatable support panel member 26" is pivotally connected to the side edge of the base support panel member 22" and the side edge of the display support panel member 24".

It is preferable that the dimensions of the support panel members used in the present invention, i.e., the height (a), the width (b), and the thickness (c) have the following relationship:

$$3a \geq b \geq a/3,$$

$$\text{if } a \geq b, a/10 \geq c \geq 1 \text{ mm}$$

$$\text{if } a < b, b/10 \geq c \geq 1 \text{ mm}$$

The limitations to the dimensions of the support panel members ensure that the mounting device can be lightweight yet still have sufficient structural strength to rotatably support the flat panel display.

The invention may also be implemented in other specific modes without departing from the spirit of the invention. Thus, the above-mentioned embodiments shall be regarded as explanatory but not restrictive. All changes that are consistent with the meaning and range of the claims and the equivalents shall fall within the scope claimed by the invention.

What is claimed is:

1. A flat panel display mounting device, comprising:
   a support mechanism comprising:
      a base support panel member to be fixed to a support surface, having a left edge and a right edge, and having a base support extension with a left end and right end;
      a display support panel member for supporting the flat panel display, having a left edge and a right edge, and having a display support extension with a left end and a right end; and one pair of rotatable support panel members being pivotally connected to the right edge of the base support panel member and the right edge of the display support panel member, and the pair of the rotatable support panel members containing two support panel members pivotally connected to each other; and a rotation control mechanism comprising a first link and a second link, both having a left end and a right end, wherein the left end of the first link is pivotally connected to the left end of the base support extension and the right end of the first link is pivotally connected to the right end of the display support extension, and the left end of the second link is pivotally connected to the left end of the display support extension and the right end of the second link is pivotally connected to the right end of the base support extension.

2. The flat panel display mounting device according to claim 1, wherein the support panel members has a truss structure.

3. The flat panel display mounting device according to claim 2, wherein the truss is solid.

4. The flat panel display mounting device according to claim 2, wherein the truss is hollow.

5. The flat panel display mounting device according to claim 1, wherein the support panel members are in the form of punched plates.

6. The flat panel display mounting device according to claim 1, wherein each of the support panel members has dimensions of height (a), length (b), and thickness (c) which have the relationship:

$$3a \geqq b \geqq a/3,$$

$$\text{if } a \geqq b, a/10 \geqq c \geqq 1 \text{ mm}$$

$$\text{if } a < b, b/10 \geqq c \geqq 1 \text{ mm}.$$

* * * * *